United States Patent [19]

Shelton, Jr.

[11] 4,209,990
[45] Jul. 1, 1980

[54] GRAVITY FLOW HYDRAULIC DEVICE

[75] Inventor: Garland T. Shelton, Jr., Hodgenville, Ky.

[73] Assignee: Shelton and Ostrowski Incorporated, Hodgenville, Ky.

[21] Appl. No.: 897,266

[22] Filed: Apr. 18, 1978

[51] Int. Cl.² .............................................. F03G 3/00
[52] U.S. Cl. ................................................... 60/640
[58] Field of Search ........................................ 60/640

[56] References Cited

U.S. PATENT DOCUMENTS

| 109,622 | 11/1870 | Hutchinson . | |
| 233,930 | 1/1880 | Lay | 60/640 |
| 1,260,204 | 3/1918 | Keithly | 60/640 |

FOREIGN PATENT DOCUMENTS 727747  4/1932  France ........................................ 60/640

*Primary Examiner*—Allen M. Ostrager

*Attorney, Agent, or Firm*—Fleit & Jacobson

[57] ABSTRACT

A hydraulic device driven by fluid flowing by the force of gravity provides a rotary driving force suitable for operating a fluid pump or a flywheel. A reciprocating balance beam is pivotally mounted and has a counterweight assembly affixed to one end and a bucket assembly affixed at the other. Upon filling the bucket with fluid, by gravity flow, the counterweight assembly is raised thereby lowering the bucket assembly until it reaches an end limit of travel, whereupon a plunger assembly immediately releases substantially all of the fluid from the bucket within a very short period of time, thereby permitting the counterweight to descend quickly to its initial position. Rods pivotally connected to the balance beam are thereby caused to reciprocate vertically. The rods can drive fluid pumping pistons or can drive a rack and pinion arrangement which cooperates with a ratchet assembly to provide continuous rotary drive input to a flywheel assembly.

9 Claims, 5 Drawing Figures

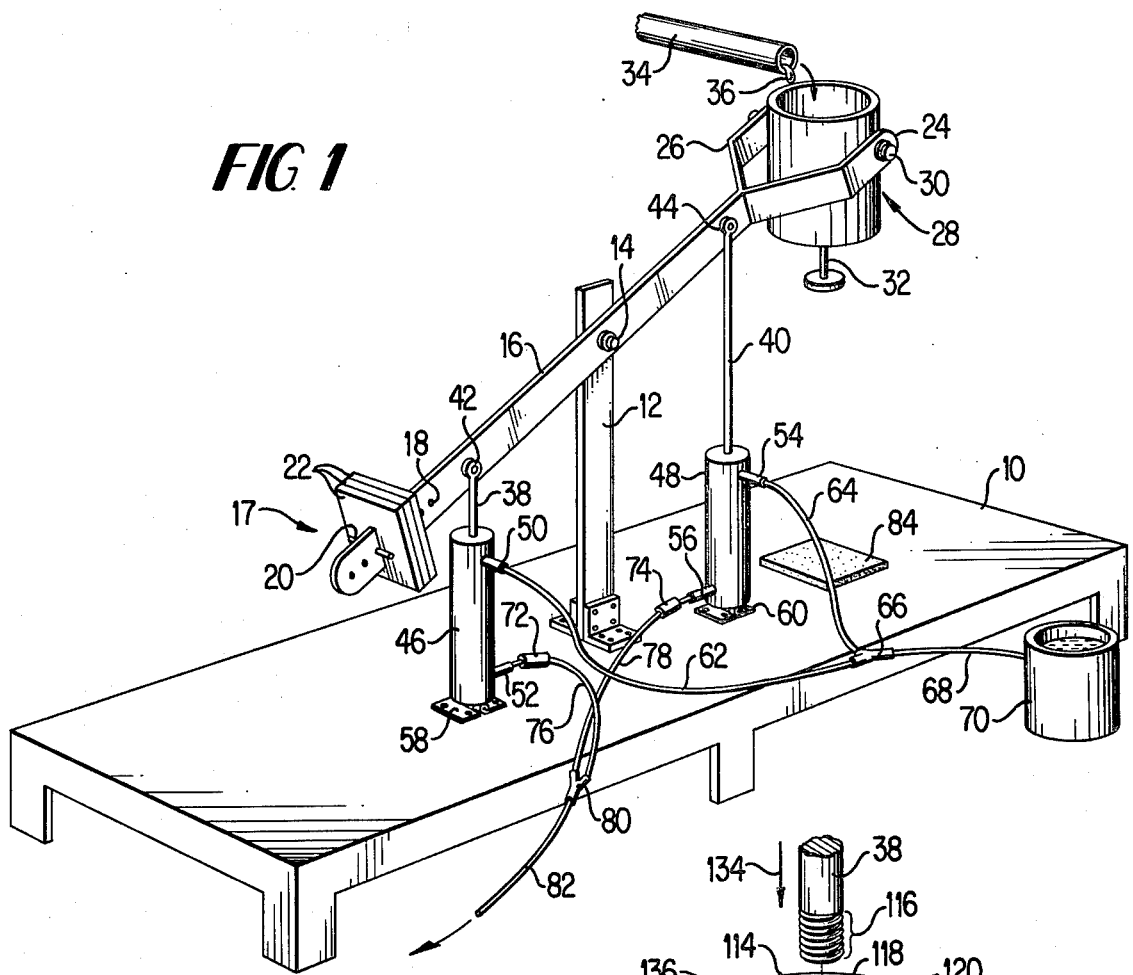
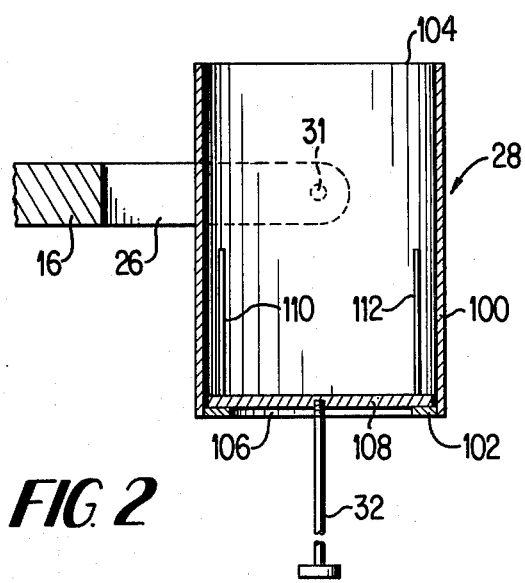
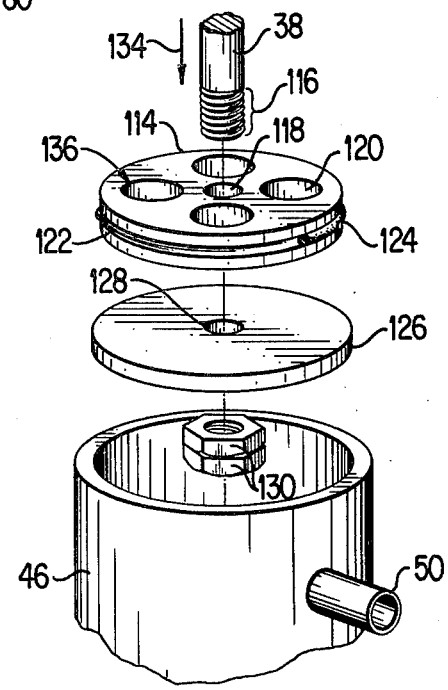
FIG. 1
FIG. 2
FIG. 3

GRAVITY FLOW HYDRAULIC DEVICE

BACKGROUND OF THE INVENTION

The present invention relates to a gravity fed hydraulic device and, more specifically, relates to a hydraulic device having a reciprocating balance beam employing a counterweight and a bucket for receiving the gravity flow fluid and for selectively releasing such fluid, thereby driving the balance beam in a reciprocating manner.

Utilizing the water flowing naturally across the surface of the earth to provide motive power has been known since the beginning of history. Examples of such utilization of gravity flow fluid drives are a gristmill, a sawmill, and, in fact, the modern electric power plant built into the huge hydro-electric dams constructed over the last fifty years. All such previous systems suffered from one disadvantage or another and, in the case of the earlier systems, they tended to be large and cumbersome and relatively permanent in their locations. In the case of the typical hydroelectric installations, they are highly complex and do not lead themselves to either inexpensive fabrication or individual use by the general public.

Representative of some of the earlier gravity flow drive fluid pumps are U.S. Pat. Nos. 109,622 issued to Hutchinson, 221,340 issued to Morgan, and 836,504 issued to Jones. The Hutchinson water elevator employs a catch lever and roller to steady the bucket during filling. The fluid used to fill the bucket is also the fluid being pumped. A disadvantage of the Hutchinson water elevator is the length of time required to drain the bucket, thereby making the device operate rather slowly. The pump of Morgan employs an upper and lower cistern, with the fluid in the upper cistern used to drive the pump, before being pumped to its ultimate destination from the lower cistern. Morgan uses a bucket on each end of a walking beam and has a complex framework and crankarm to tip over alternately the full buckets to obtain reciprocal motion. In the Jones pump, two buckets are also used in conjunction with a complicated oscillating through arrangement to feed water alternately to the buckets. Instead of tipping the buckets to empty them, Jones provides a tapered valve stem and a small outlet opening in the bottom of the bucket to release the water.

All of these prior devices suffer various drawbacks, the most common being the complex mechanical arrangements employed to achieve reciprocal pump drive. Additionally, the piping and valving arrangements employed to fill and empty the buckets are overly complex for the simple tasks which they perform.

Additionally, due to recent national and international events, attention has been turned away from the traditional power sources, such as fossil fuels and the like, for generating electricity and attention is now being directed towards utilizing the natural environment to provide motive power. For example, California is exploiting geothermal capabilities and solar power systems are being built in many diverse locations.

Therefore, although it has now become more economical to attempt to use gravity fed fluid, i.e., streams and rivers flowing with some rapidity, as a source of motive power, the type of hydraulic device which utilizes gravity fluid flow as a motive force has in the past been highly complex and has required a large number of valves, moving parts and complicated piping arrangements.

BRIEF SUMMARY OF THE INVENTION

The present invention utilizes fluid normally flowing under the influence of gravity, such as the water in streams or rivers, to provide a source of power for a hydraulic device operating as a fluid motor. The present invention employs a pivotally mounted balance beam which has a counterweight movably affixed to one end and a specialized fluid container or bucket at the other end. The device of the present invention receives the fluid and, upon a predetermined extent of travel of the beam, releases all of the fluid immediately, so as to permit the counterweight to return the beam quickly to a first position. By utilizing drive rods connected to specific points on the pivotable beam, the present invention can, in one embodiment, operate the pistons of pumping cylinders so as to pump fluid from one place to another. The fluid being pumped need not necessarily have to be the fluid which is being utilized to provide the motive power. In another embodiment, the present invention can drive a flywheel assembly to drive an electrical generator or other apparatus. The present invention is designed to be simple in its construction when compared to the previously known devices, such as those described hereinabove. This design simplicity keeps the number and complexity of the parts required to manufacture and assemble the present invention at a low level, thereby achieving both reliability and cost effectiveness.

The bucket provided by the present invention, which receives the gravity flow fluid, is held in a yoke assembly located at one end of the pivotable beam. The bucket is pivoted in the yoke so as to remain upright, i.e., vertically aligned, at all times. A specialized plunger and plate assembly operates as a discharge port at the bottom of the bucket and covers substantially the entire area of the bottom of the bucket, so as to instantaneously dump all of the fluid from the bucket. The plunger and plate assembly has specially arranged guide rods, located on its innermost surface so as to prevent tipping and binding of the plunger and plate assembly during operation. The beam has been provided with various stops so that the counterweight assembly may be adjusted to accommodate the reciprocating speed of the beam which is desired and, also, on the size of the bucket or the extent to which such bucket may be filled.

Additionally, the guide rods which are connected to the pivotable beam of the inventive fluid motor may be utilized with a rack and pinion gear arrangement to drive a fly-wheel which may uttimately be connected to an electrical generator or the like.

Furthermore, the fluid pump and the electrical generator may be so arranged as to be driven simultaneously by the hydraulic device provided by the present invention.

Therefore, it is an object of the present invention to provide a hydraulic device which derives its motive power from fluid which is flowing under the influence of gravity.

It is another object of the present invention to provide a hydraulic device having a reciprocating balance beam having a bucket at one end which can receive the gravity flow fluid and drive the beam and having means to release the fluid upon a predetermined extent of travel of the beam.

It is still another object of the present invention to provide a hydraulic device which utilizes fluid flowing under the influence of gravity to operate a fluid pump.

It is a further object of the present invention to provide a fluid motor which derives its power from fluid flowing under the influence of gravity and which incorporates a gear assembly to provide the motive power to drive a flywheel assembly.

The manner in which these and other objects of the present invention are accomplished will become apparent from the following detailed description, as well as from the appended claims.

BRIEF DESCRIPTION OF THE DRAWINGS

FIG. 1 is a perspective view of the inventive hydraulic device operating as a fluid pump.

FIG. 2 is a cross-sectional view of the inventive bucket assembly of the embodiment of FIG. 1, taken along site line 2—2.

FIG. 3 is a detailed perspective view of the plunger assembly and the pumping cylinder of the embodiment of FIG. 1.

DETAILED DESCRIPTION OF THE DRAWINGS

Figure 4:
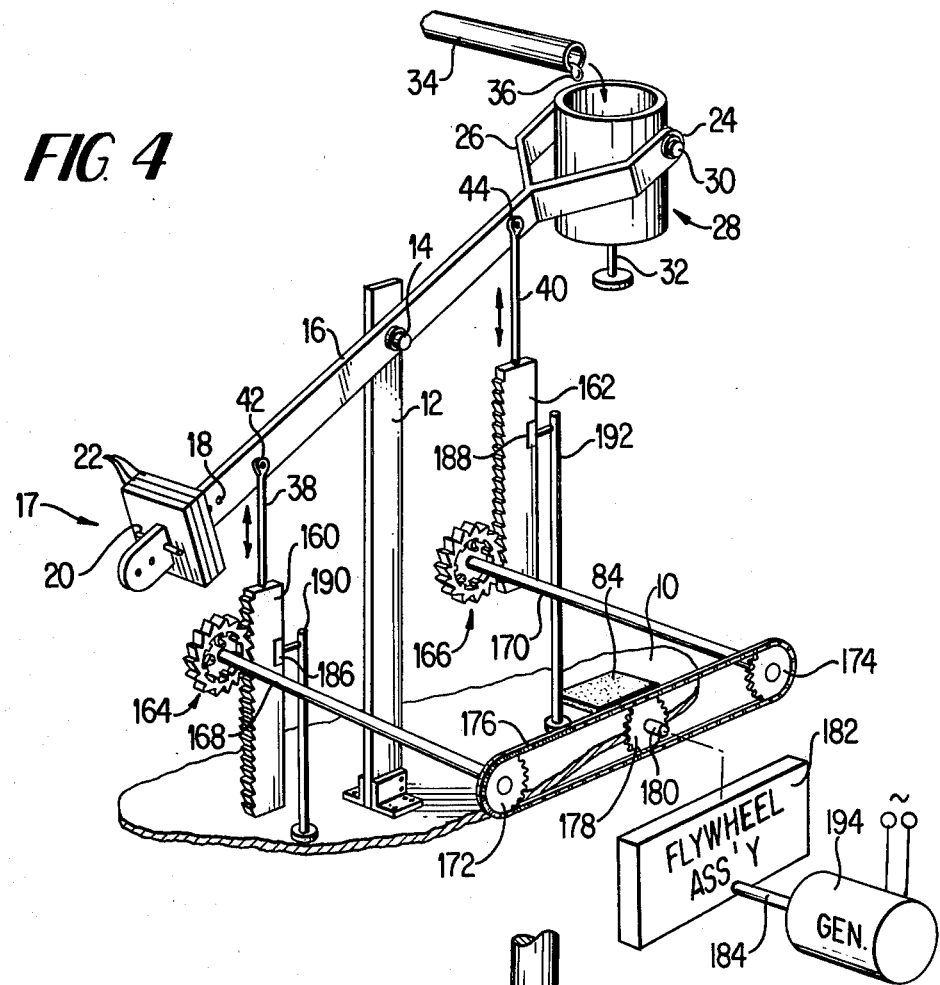
FIG. 4 is a perspective view of the inventive hydraulic device operating as a drive for a flywheel assembly.

Referring now to FIG. 1, the inventive hydraulic device is shown being operated as a fluid pump. In the embodiment of FIG. 1, the hydraulic device is assembled on a rigid base plate 10 which serves as the support for the fluid motor assembly. Firmly attached to the base plate 10 is an upright member 12 which may be firmly affixed to the base plate 10 in any convenient manner and not necessarily as shown in FIG. 1. A pivot means 14 is provided on the upstanding member 12 so as to pivotably mount an elongated beam 16 to the upraised element 12. The elongated beam 16 forms the reciprocating balance beam, referred to hereinabove. At one end of the elongated beam 16 the counterweight assembly 17 is located. A plurality of holes are provided, shown typically at 18, and which cooperate with two rods or bolts 20, only one of which can be seen, to mount the large counterweight elements, three of which are shown at 22. The counterweight plates 22, although shown in rectangular form, may be of any convenient plate-like configuration. By means of the plurality of holes 18 and the adjustable rods 20, the number of counterweight plates 22 affixed to the beam 16 may be varied in accordance with the need. Additionally, the position along the length of the beam of the counterweight plates 22 may also be varied, in order to provide additional adaptability to the counterweight function.

At the end of the elongated beam opposite the counterweight assembly 17, a yoke having two arms 24 and 26 is provided. Mounted within the space formed by the arms 24 and 26 is a barrel or bucket assembly 28. The barrel assembly 28 is pivotably mounted by two pivots 30 and 31 mounted in the arms 24 and 26, respectively. The bucket member 28 is provided with an inventive plunger assembly 32 for releasing the fluid contained therein. The fluid should be fed into the bucket from some suitable fluid source by means of gravity flow. The suitable fluid source is diagrammatically shown at 34 and, as may be seen, is located with its outlet such that the fluid, as shown by arrow 36, may flow into the pivotable bucket assembly 28. Because the bucket assembly 28 is pivoted, it will remain upright at all times.

Mounted between the center pivot 14 and the counterweight assembly is a rod 38 and mounted between the center pivot 14 and the bucket assembly is another rod 40. These rods 38, 40 are pivotably mounted to the beam 16 by means of pivots or bearings located at 42 and 44. Affixed to each of the pivotable rods 38 and 40 are plungers, which will be shown in more detail hereinbelow, located inside cylinders 46 and 48.

Cylinder 46 has an inlet port 50 and an outlet port 52 and, similarly, cylinder 48 has an inlet port 54 and an outlet port 56. Since the pivot points 42 and 44 are located on the elongated reciprocating balance beam 16, which itself is pivotally mounted at 14, then during the motion of the beam 16 these points 42 and 44 will follow a curved path. Therefore, the cylinders 46 and 48 must be mounted to the base plate 10 so as to permit them to move from the true vertical. This is necessary to permit the plungers at the other end of the rods 38 and 40 to follow a curved path, as required during the pivoting of the beam 16. To accomplish such motion, the cylinders 46 and 48 are mounted at their lowermost ends to the base plate 10 by means of hinges or the like, shown at 58 and 60. These hinges 58 and 60 will then permit the cylinders to then vary from the vertical so as to permit the plungers to follow those portions of an arc described by the loci of the pivot points 42 and 44.

The inlet ports 50 and 54 of cylinders 46 and 48 are connected respectively by tubes 62 and 64 through a Y-connector 66, which is then connected by a suitable fluid conduit 68 to the source of fluid to be pumped, represented diagrammatically at 70. The output ports 52 and 56 are connected respectively through one-way valve means 72, 74 and with tubing sections 76 and 78, which are connected to a conventional Y-connector 80. The output of this Y-connector 80 is the fluid output of the system and may then be fed off by means of any suitable fluid conduit 82.

The hydraulic device, shown in FIG. 1, operates as follows. Fluid is provided from the suitable gravity flow fluid source 34 into the bucket assembly 28 thereby serving to fill the bucket with fluid. As the volume of fluid increases, its weight will tend to overcome the weight of the counterweight plates 22 and the bucket assembly will begin to descend towards the base plate 10. Since the bucket or barrel 28 is pivotably mounted by pivots 30 and 31 between the yoke arms 24, 26 it will at all times remain upright. As the fluid then continues to fill the barrel, the barrel will descend to an extent that the end of plunger 32 will contact an impact plate 84 affixed to plate 10 and thereby actuate the plunger 32 and permit the fluid which had been captured in the barrel assembly 28 to be instantaneously discharged. When the barrel 28 had been caused to descend by the increase weight of the fluid, the counterweight plates 22 had been raised upwardly. Accordingly, when the fluid is released from the barrel assembly 28 the counterweight assembly will raise the barrel assembly 28, thereby eliminating the contact between the impact plate 84 and the plunger 32, closing the barrel once again, and permitting it to begin to collect the gravity flow fluid once again.

The motion of the beam 16 will then impart a similar motion to the pivotable shafts 38 and 40 which are connected to pumping plungers located within the cylinders 46 and 48. Accordingly, as the beam 16 reciprocates, or goes through the pivoting cycle, this motion is transferred to the rods 38 and 40, thereby causing the plungers to reciprocate also within the pump cylinders 46 and 48. At the pont of operation, as shown in FIG. 1, the rod 38 is at its downmost stroke which would correspond to an inlet stroke and fluid will be permitted to enter cylinder 46 from the fluid supply 70. Conversely, the rod 40 is at its topmost stroke and momentarily will be beginning to pump the fluid, which has been fed into the cylinder 48 from the fluid supply 70. Because one-way valves have been provided in the outlet ports 52, 56 of the cylinders 46 and 48, the output fluid is not permitted to flow back into the pump cylinder at anytime during the pumping cycle. The manner in which the cylinder and pump plungers cooperate will be shown in more detail below, as will be the manner in which the fluid is released from the barrel assembly 28.

According to the present invention, the speed of reciprocation of the hydraulic device is determined by the rate of pivoting of beam 16 and may be controlled by choosing the size of the counterweight and the length of the plunger 32 so as to provide either a long pumping stroke or a short pumping stroke depending upon the specific system utilizing the present invention. However, it is noted that the present invention may be constructed using a beam 16 of six feet in length and pump cylinders 46, 48 approximately two feet in length, thereby permitting a pumping stroke in excess of eighteen inches. This long pump stroke is most effective in moving large amounts of fluid with high pressures. Also when using the inventive apparatus with the rack and pinion drive, the long stroke provides an advantageous drive motion for the flywheel.

Of course, these dimensions are only exemplary and the present invention can be fabricated in any size, either larger or smaller than the example above.

Referring now to FIG. 2, the barrel assembly 28 and plunger 32 are shown in cross section taken along site line 2—2 of FIG. 1. The elongated pivotable beam 16 is seen in cross section and the inner portion of arm 26 of the yoke is also seen. Also shown in phantom, is the pivotable mounting 31 which cooperates with pivot 30 to permit the barrel assembly 28 to remain upright as it ascends and descends during the reciprocating motion of the beam 16. The barrel assembly 28 is formed by first taking a metal cylinder 100 and welding to the inner surface, at the bottom of the cylinder 100, a metal ring 102 formed having a substantially rectangular cross section and having a circular opening therein, thereby providing a container which is open at the top 104 and has a relatively large opening 106 at the bottom when compared with previously known devices, such as those discussed hereinabove. A disc 108 having a diameter slightly less than the inner diameter of the cylinder 100 is then affixed to the plunger rod 32. Attached to the inner surface of the disc 108 are upstanding guide rods, two of which are seen at 110 and 112. In the preferred embodiment, it has been found that three guide rods equally spaced around the perimeter of the sealing disc 108 provide the desired function.

In the operation of the embodiment shown in FIG. 1, when the plunger 32 contacts the impact plate 84, the disc 108 will be raised off the shoulder of interior ring 102, thereby opening the opening 106 and permitting all of the fluid contained in the barrel assembly 28 to flow out instantaneously. The alignment rods or guide rods 110 and 112 serve to retain the orientation of the sealing plate 108 and plunger 32 since any misalignment or binding of the plate and rod assembly is prevented by the contact between the inside of the cylinder walls 100 and the appropriate guide rod 110 or 112, or the guide rod (not shown) which comprises the third one of the preferred number of three interior guide rods.

Referring now to FIG. 3, one of the pumping cylinders 46 is shown in more detail. The guide rod 38 is threadably connected to a plunger disc 114 by threading the threaded portion 116 of the rod 38 through the tapped hole 118. The plunger disc 114 has an outside diameter which is only slightly less than the inside diameter of the pumping cylinder 46. The plunger disc 114 is formed having a plurality of ports or holes bored through the plunger so as to permit fluid communication from one side of the plunger to the other. The plurality of holes or ports is shown typically at 120 and, in the embodiment under discussion, four such ports are provided. The plunger disc 114 has a circumferential groove 122 cut in the side surface, located in this groove 122 is an O-ring 124 or other suitable circular gasket. A portion of the O-ring 124 has been cut away in FIG. 3 to show the location of the circumferential groove 122. It is appreciated, of course, that the gross diameter of the plunger 114 is fixed by the exterior dimensions of the O-ring 124 and this should be somewhat larger than the inside diameter of the cylinder. During assembly, the threaded portion 116 is threaded through the plunger disc 114 until the disc 114 and rod 38 are locked together. A valve plate 126 having a central hole 128 bored therein, which is of a diameter slightly larger than the rod 38, is placed over the extending threaded portion 116. The valve plate 126 is slidably retained on the threaded portion 116 by means of a jam nut assembly 130. This can be the conventional jam nut assembly formed of two separate nuts, or it could be the more modern type having a deformable synthetic elastomeric insert. Upon assembly, the valve plate 126 is permitted to freely slide for a limited distance on the threaded portion 116.

In operation, the portion of the fluid pump shown in FIG. 3 acts to take the fluid fed into the inlet port 50, in the direction of arrow 132, and to permit it to pass through the ports 120 in the plunger disc 114 in the direction of arrow 136 and over the valve plate 126. Accordingly, during the downward stroke of the plunger rod 38, as shown by arrow 134, the resistance of the fluid in the chamber will cause the valve plate 126 to ride up the threaded portion 116 and to abut the plunger disc 114, thereby closing off the ports 120, hence the fluid will not be permitted to flow back through the ports 120 but will be retained beneath the disc 114 by the sealing action between the O-ring 126 and the inner bore of the pump cylinder 46 and the valve plate 126 and the disc 114. Conversely on the upward stroke of the rod 38, the fluid being fed in the inlet port 50 will be permitted to flow through ports 120 in the plunger disc 126, as shown by arrow 136, since the valve plate 126 has now slid down the threaded portion 116 away from the ports 120 and is held by the jam nut assembly 130 so as to fill the pump cylinder 46 in preparation for the next downward stroke whereby the fluid in the cylinder will be pumped out of outlet port, 52 of FIG. 1.

The construction and operation of pump cylinder 48 is identical to that of pump cylinder 46, which has just been described. The two pump cylinders, of course, are operated 180° out of phase with each other.

Referring now to FIG. 4, the inventive gravity flow hydraulic device is shown operating a mechanical drive assembly to produce rotary shaft motion. The reciprocating balance beam 16 is identical to that shown in FIG. 1 and is driven once again by the action of the barrel assembly 28 being filled by the gravity flowing fluid from source 34 so as to cause the barrel assembly 28 to descend, thereby causing the plunger 32 to contact the impact plate 84 and to immediately release all of the fluid, thereby causing the counterweight assembly 22 to once again descend causing the beam 16 to pivot about point 14. The drive rod utilized in the pumping function of FIG. 1, may also be utilized in the embodiment shown in FIG. 4.

The drive rod 38, which is pivotably mounted at 42 to the beam 16, is affixed at its other end to a rack gear 160 and, similarly drive rod 40, which is pivotably mounted to the beam 16 at 44, is firmly affixed to another rack gear 162.

Cooperating with the rack gears 160 and 162 are pinion gears 164 and 166, respectively. A ratchet-type gear arrangement is provided in the interior portion of each of the pinion gears 164 and 166 and will be shown in more detail in FIG. 5. However, rotating output shaft 168, or 170, is provided from each of the pinion gears 164, or 166, respectively. The output shafts 168, 170 are connected respectively to sprocket wheels 172, 174. These two sprocket wheels 172, 174 are connected by a chain 176 which in turn drives a central sprocket wheel 178. The central sprocket wheel 178 is then continuously driven by the combination of the rotary motion of drive shafts 168 and 170. The central sprocket wheel 178 has a drive shaft 180 which is shown diagrammatically being connected to a flywheel assembly 182 which also has a rotating output shaft 184.

Because, as discussed in relation to the embodiment of FIG. 1, the loci of points described by pivots 42 and 44 are portions of a circle, the rack gears 160 and 162 are also imparted with a certain nonlinear motion. Accordingly, sliding keeper assemblies 186 and 188 serve to permit the rack to move linearly in a vertical direction without binding yet will permit the rack to move off of the vertical during its reciprocating motion. The interior surfaces of the sliding keeper assemblies 186 and 188 may be furnished with a suitable bearing material such as Teflon, or the like. The sliding keepers 186 and 188 are affixed to the main platform 10 by any suitable mechanical support members, such as shown at 190 and 192.

In operation, the substantially linear motion imparted by the reciprocating balance beam 16, as driven by the gravity flow of the fluid into the bucket assembly 28, is imparted on alternate strokes to the respective pinion gear assemblies 164 and 166. As will be seen hereinafter, the driving of the shafts 168 and 170 is in an alternating fashion wherein the shafts are not driven simultaneously. This, of course, may be appreciated since it is clear that the rack gears 160 and 162 can never move in the same direction but must move in the opposite directions at all times. The output shafts 168 and 170 are then mechanically connected by the sprockets 172, 174 and 178 and chain 176 through drive shaft 180 to the flywheel assembly 182 and serve to drive the flywheel assembly continuously. In this way the alternating motion of drive shafts 168 and 170 provide a continuously driven output shaft 184. It is noted that since flywheel assemblies are extremely well-known and it is not necessary to show specific details of such flywheel assembly, any conventional type flywheel assembly can be driven by the inventive gravity flow hydraulic device. As discussed above, the present invention is particularly adapted to driving an electric generator 194.

Figure 5:
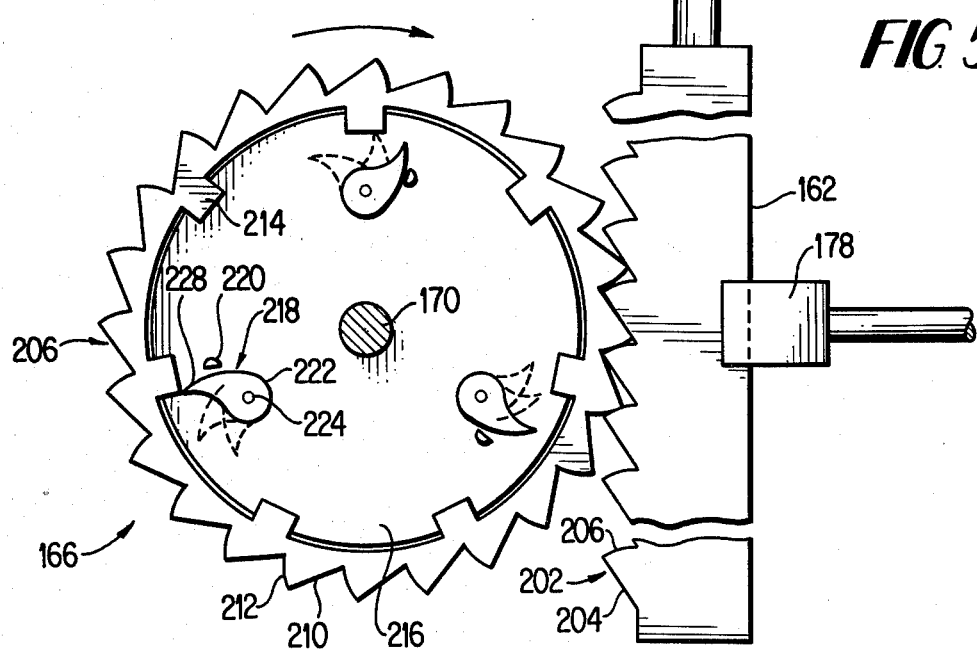
FIG. 5 is a front elevation view of the rack and pinion assembly utilized in the embodiment of FIG. 4.

In regard to the pinion gear assemblies 164 and 166, reference is made to FIG. 5. The rack gear 162 is shown being held by the slidable keeper 188 and it is driven substantially linearly in a vertical direction, as shown by the doubeleheaded arrow 200, by the drive rod 40. The rack gear is provided with specially formed teeth, shown typically at 202, and, in this regard, it is seen that each tooth is formed having a flat surface 204 and an arcuately shaped surface 206. The pinion gear assembly 166 is formed having an outer gear ring 208 and the teeth on the outer gear ring 208 are formed identically to the teeth on the rack, i.e., having typically a flat surface 210 and an arcuate surface 212. The pinion gear assembly 166 is also formed having radially inwardly facing teeth, which are formed as rectangular projections shown at 214. Located inside and on the same center as the outer gear ring 208 is an inner ratchet plate 216, which has the drive shaft 170 affixed thereto. The inner ratchet plate 216 is on the same center as the outer gear ring 208 but rotates independently thereof. More specifically, the drive shaft 170 is caused to rotate in only one direction by means of a ratchet and pawl arrangement. In the present embodiment, at least three pawls, shown typically at 218, cooperate with the plurality of radially inwardly facing teeth 214 of the outer gear ring 208 to provide unidirectional rotary motion for the shaft 170. The pawls cooperate with the stops, shown typically at 220, and each pawl consists of a dog 222 pivotally mounted by a suitable bearing 224.

In the operation of the rack and pinion drive assembly shown in FIG. 5, the rack is first driven, for example, in a downward direction thereby causing the flat portions 204 of the rack gear 162 to cooperate with the flat portion 210 of the pinion gear teeth. This imparts a circular motion to the outer gear ring 208, as shown by arrow 228. Since the outer gear ring 208 is moving in a clockwise direction, the radially inwardly facing rectangular teeth 214 will then contact the nearest pawl assembly 218 and drive it also in a clockwise direction. When one of the rectangular teeth 214 contacts the dog 222, it causes the dog to be rotated about bearing 224 and to abut the stop 220. In this way the entire ratchet plate 216 is driven in a clockwise direction. Because the output shaft 170 is connected to the ratchet plate 216, a rotary clockwise drive motion is imparted to it.

When the rack gear 162 beings its upward stroke, the arcuate portions 206 of the rack gear teeth 202 will contact the arcuate portions 212 of the pinion gear teeth and the outer gear ring 208 will be rotated in a counterclockwise direction. When this occurs, the radially inwardly facing teeth 214 will contact the arcuate surface 228 of the dog 222 and, since there is no stop similar to stop 220 for the other direction of motion, the pivotable pawl 218 will be merely permitted to fall forward in the counterclockwise direction and no driving force will be imparted to the ratchet plate 216 and, hence, no rotary drive motion will be applied to the output shaft 170. As discussed in relation to FIG. 4, during the upward stroke of the rack gear 162, shown in FIG. 5, the counterpart rack gear 160 will be undergoing downward motion and the pinion gear assembly 164 of FIG. 4 will also be driven in a clockwise direction in the identical manner as pinion gear assembly 166.

The chain 176 and sprockets 172, 174 and 176 operate to translate the alternate rotary drive, of drive shafts 168 and 170 into a continuously driven output shaft 180.

This drive shaft 180 is connected to the power input of the flywheel assembly 182. Hence, the flywheel assembly 182 receives all of the output energy produced by the inventive hydraulic device less, of course, losses due to friction.

In another embodiment of the present invention, the pumping cylinders can be used in combination with the flywheel drive assembly of FIG. 4, thereby providing both a fluid pumping function, as well as a means for generating electricity.

It is, of course, understood that the foregoing is given by way of example only and is not intended to limit the scope of the present invention, except as provided in the appended claims.

I claim:

1. An improved hydraulic device for use with fluid flowing by the force of gravity, of the type having a base, an upstanding support member affixed to said base, a balance beam pivotally mounted on said support member, counterweight means mounted on one end of said balance beam, a fluid container connected to the other end of said balance beam and arranged to receive said fluid flowing by the force of gravity; the improvement comprising:

fluid release means having a valve plate arrange for vertical movement within said fluid container and dimensioned to form substantially the entire bottom of said fluid container, said fluid release means having an actuation member attached to said valve plate and arranged to vertically displace said valve plate to release quickly substantially all of the fluid in said fluid container upon said actuation member contacting said base and having alignment means located inside and fluid container for preventing misalignment of said valve plate and said container when said valve plate is vertically displaced by said actuation member;

two drive rods each having a first end pivotally connected to said balance beam in spaced apart relationship from the point where said balance beam is pivotally mounted to said support member and having a second end for providing a vertical reciprocating motive drive;

two rack and pinion gear means each having a respective rack connected to one of said second ends of said drive rods;

two ratchet means each respectively operably engaged with said pinion gears and each having an output shaft rigidly attached thereto, said two ratchet means being arranged to transfer the rotary motion of said pinion gears to cause said output shafts to rotate in the same direction; and transmission means operably connected to said output shafts of said ratchet means and having an output shaft for producing a continuous unidirectional rotary driving force, whereby said fluid flowing into said container causes said container to overcome the weight of said counterweight and causes said balance beam to pivot, thereby moving one of said drive rods in a first direction and bringing said actuation member in contact with said base and instantaneously releasing substantially all of said fluid from said container, and thereby causing the weight of said counterweight to pivot the balance beam and move the other of said drive rods in said first direction.

2. The device of claim 1 wherein said transmission means comprises:

first and second sprocket means respectively connected to said two ratchet means output shafts, an endless chain operably interconnecting said first and second sprocket means, and third sprocket means engaged with said chain and having an output shaft for providing continuous rotary output drive.

3. The device of claim 2 further comprising: flywheel means having an input connected to said third sprocket means output shaft and having an output shaft for providing a rotary driving force.

4. The device of claim 2 further comprising means affixed to said base for slidably retaining said rack gears so that said rack gears can move vertically when driven by said drive rods.

5. The device of claim 2 wherein said rack gear and said pinion gear are provided with gear teeth having a flat driving surface and an arcuately shaped returning surface.

6. The device of claim 1 wherein said counterweight assembly is adjustable and comprises:

a plurality of holes arranged through said balance beam at said one end;

a plurality of plate-like weights each having a centrally located hole for slidably engaging said balance beam; and two pin means each for placement through one of said holes and being located in front of and at the rear of said plurality of plates whereby said plates are attached to said one end of said balance beam.

7. The apparatus of claim 1 further comprising:

a Y-shaped yoke arranged at said other end of said balance beam; and pivot means located in each arm of said Y-shaped yoke, whereby said fluid container is arranged between the arms of said yoke and pivotally attached to said pivots such that said fluid contaner remains upright at all possible orientations of said balance beam.

8. The device of claim 1 further comprising a flywheel having an input connected to said output shaft of said transmission means and having an output shaft for producing a rotary output drive.

9. The device of claim 8 further comprising an electrical generator connected to be driven by said fly-wheel for generating electrical power from said rotary output drive.

* * * * *